US011954916B2

(12) United States Patent
Tong et al.

(10) Patent No.: US 11,954,916 B2
(45) Date of Patent: Apr. 9, 2024

(54) SYSTEMS AND METHODS FOR CLASSIFYING DETECTED OBJECTS IN AN IMAGE AT AN AUTOMATED DRIVING SYSTEM

(71) Applicant: GM Global Technology Operations LLC, Detroit, MI (US)

(72) Inventors: Wei Tong, Troy, MI (US); Siddhartha Gupta, Rochester Hills, MI (US); Jacob Alan Bond, Rochester Hills, MI (US); Zhuoning Yuan, Iowa City, IA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 329 days.

(21) Appl. No.: 17/665,895

(22) Filed: Feb. 7, 2022

(65) Prior Publication Data

US 2023/0252795 A1 Aug. 10, 2023

(51) Int. Cl.
*G06V 20/00* (2022.01)
*B60W 40/04* (2006.01)
*B60W 60/00* (2020.01)
*G06V 10/40* (2022.01)
*G06V 10/74* (2022.01)
*G06V 10/764* (2022.01)
(Continued)

(52) U.S. Cl.
CPC ............ *G06V 20/58* (2022.01); *B60W 40/04* (2013.01); *B60W 60/001* (2020.02); *G06V 10/40* (2022.01); *G06V 10/761* (2022.01); *G06V 10/764* (2022.01); *G06V 10/82* (2022.01); *B60W 2420/403* (2013.01); *B60W 2554/4026* (2020.02); *B60W 2554/4029* (2020.02)

(58) Field of Classification Search
CPC ...... G06V 20/58; G06V 10/40; G06V 10/761; G06V 10/764; G06V 10/82; G06V 20/56; G06V 10/774; B60W 40/04; B60W 60/001; B60W 2420/403; B60W 2554/4026; B60W 2554/4029; G06N 3/063; G06N 3/08
See application file for complete search history.

(56) References Cited

U.S. PATENT DOCUMENTS

2013/0051624 A1* 2/2013 Iwasaki ............... G06V 10/255
382/103
2022/0161815 A1* 5/2022 Van Beek ............. G06N 20/00
(Continued)

*Primary Examiner* — Md K Talukder
(74) *Attorney, Agent, or Firm* — Vivacqua Crane PLLC

(57) ABSTRACT

An automated driving system includes an object detection system. A neural network image encoder generates image embeddings associated with an image including an object. A neural network text encoder generates concept embeddings associated with each of a plurality of concepts. Each of the plurality of concepts is associated with one of at least two object classes. A confidence score module generates a confidence score for each of the plurality of concepts based on the image embeddings and the concept embeddings associated with the concept. An object class prediction module generates a predicted object class of the object based on an association between a set of concepts of the plurality of concepts having at least two of the highest values of the generated confidence scores and the one of the at least two object classes associated with a majority of the set of concepts.

20 Claims, 7 Drawing Sheets

(51) Int. Cl.
    *G06V 10/82*     (2022.01)
    *G06V 20/58*     (2022.01)

(56) References Cited

U.S. PATENT DOCUMENTS

| | | | |
|---|---|---|---|
| 2023/0206329 A1* | 6/2023 | Cella | G06Q 20/367 |
| 2023/0252795 A1* | 8/2023 | Tong | G06V 20/58 |
| | | | 382/104 |

\* cited by examiner

| CAR | CS | BUS | CS | BICYCLE | CS |
|---|---|---|---|---|---|
| Windshield of a Car | 0.18 | Tire of a Bus | 0.27 | Seat of a Bicycle | 0.22 |
| Fog Light of a Car | 0.21 | Gate of a Bus | 0.29 | Basket of a Bicycle | 0.2 |
| License Plate Lamp of a Car | 0.23 | Wheels of a Bus | 0.26 | Lock of a Bicycle | 0.2 |
| Windscreen of a Car | 0.22 | Bumper of a Bus | 0.29 | Handlebar of a Bicycle | 0.2 |
| Windshield Wipers of a Car | 0.21 | Street Light of a Bus | 0.28 | Bell of a Bicycle | 0.21 |
| Headlights of a Car | 0.21 | Front Light of a Bus | 0.27 | Pedal of a Bicycle | 0.19 |
| Taillights of a Car | 0.22 | Rear Light of a Bus | 0.26 | Tire of a Bicycle | 0.22 |
| | | Left Indicattor of a Bus | 0.28 | Spokes of a Bicycle | 0.19 |
| | | Right Indicator of a Bus | 0.29 | Tire of a Bicycle | 0.22 |
| | | Windows of a Bus | 0.27 | Reflector of a Bicycle | 0.22 |
| | | Headlamp of a Bus | 0.26 | | |
| | | Windshield of a Bus | 0.26 | | |
| | | Top Windows of a Bus | 0.25 | | |
| | | Front License Plate of a Bus | 0.3 | | |
| | | Headlight of a Bus | 0.27 | | |
| | | Reflector of a Bus | 0.28 | | |

FIG.6A

| MOTORCYCLE | CS | PERSON | CS |
|---|---|---|---|
| Helmet of a Motorcycle | 0.21 | Head of a Person | 0.2 |
| Ground of a Motorcycle | 0.21 | Arm of a Person | 0.19 |
| Trim of a Motorcycle | 0.2 | Hand of a Person | 0.19 |
| Engine of a Motorcycle | 0.21 | Leg of a Person | 0.2 |
| Miror of a Motorcycle | 0.2 | Feet of a Person | 0.2 |
| Handlebar of a Motorcycle | 0.2 | Ear of a Person | 0.19 |
| Spokes of a Motorcycle | 0.2 | Nose of a Person | 0.2 |
| Bolts of a Motorcycle | 0.2 | Body of a Person | 0.21 |
| | | Neck of a Person | 0.2 |

FIG.6B

SYSTEMS AND METHODS FOR CLASSIFYING DETECTED OBJECTS IN AN IMAGE AT AN AUTOMATED DRIVING SYSTEM

INTRODUCTION

The technical field generally relates to autonomous vehicles, and more particularly relates to systems and methods for classifying detected objects in an image at an automated driving system (ADS).

The ADS of an autonomous vehicle typically receives images from a vehicle sensor system. The received images often represent observable conditions of the exterior environment of the autonomous vehicle. The ADS may rely on a classification of objects detected in the images to manage the performance of the autonomous vehicle.

Images captured by the vehicle sensor system in a relative low visibility environment, such as for example during inclement weather conditions, may not be as clear as images captured during fair weather conditions. The representative features that are typically used to classify a detected object in an image may not be as easily discernable in such images. It may be beneficial to use an object detection system that may be able to classify detected objects in the images captured in low visibility environments.

SUMMARY

In an embodiment, an automated driving system (ADS) of an autonomous vehicle includes an object detection system including a neural network image encoder configured to generate image embeddings associated with at least a portion of an image generated by a vehicle sensor system, the at least the portion of the image including an object; a neural network text encoder configured to generate concept embeddings associated with each of a plurality of concepts, each of the plurality of concepts being associated with one of at least two object classes; a confidence score module configured to generate a confidence score for each of the plurality of concepts based on the image embeddings and the concept embeddings associated with the concept; an object class prediction module configured to generate a predicted object class of the object based on an association between a set of concepts of the plurality of concepts having at least two of the highest values of the generated confidence scores and the one of the at least two object classes associated with a majority of the set of concepts; and a processor configured to manage performance of the autonomous vehicle based in part on the predicted object class of the object.

In an embodiment, each of the plurality of concepts is associated with the one of the at least two object classes comprise a pre-defined concept.

In an embodiment, the object classes of the at least two object classes comprise at least two of a car, a bus, a bicycle, a motorcycle, and a pedestrian.

In an embodiment, the system further includes an object candidate module configured to detect the object in the image received from the vehicle sensor system and generate the at least the portion of the image based on a location of the detected object in the image.

In an embodiment, the object candidate module is configured to implement one of a Fast Region-based Convolutional Network (Fast R-CNN) method and a You Look Only Once (YOLO) method.

In an embodiment, the system further includes a feature extraction neural network including the neural network image encoder and the neural network text encoder, wherein the feature extraction neural network is configured to be pre-trained to connect the plurality of concepts with image data associated with each of the at least two object classes by a feature extraction neural network training system.

In an embodiment, the confidence score module is configured to generate the confidence score for each of the plurality of concepts by applying a cosine similarity function to the image embeddings and the concept embeddings associated with the concept.

In an embodiment, a computer readable medium includes instructions stored thereon for classifying a detected object in an image at an automated driving system (ADS), that upon execution by a processor, causes the processor to: generate image embeddings associated with at least a portion of an image generated by a vehicle sensor system, the at least the portion of the image including an object; generate concept embeddings associated with each of a plurality of concepts, each of the plurality of concepts being associated with one of at least two object classes; generate a confidence score for each of the plurality of concepts based on the image embeddings and the concept embeddings associated with the concept; generate a predicted object class of the object based on an association between a set of concepts of the plurality of concepts having at least two of the highest values of the generated confidence scores and the one of the at least two object classes associated with a majority of the set of concepts; and manage performance of the autonomous vehicle based in part on the predicted object class of the object.

In an embodiment, the computer readable medium further includes instructions to cause the processor to generate the concept embeddings associated with each of the plurality of concepts, each of the plurality of concepts associated with the one of the at least two object classes comprising a pre-defined concept.

In an embodiment, the computer readable medium further includes instructions to cause the processor to generate the concept embeddings associated with each of the plurality of concepts, each of the plurality of concepts being associated with the one of the at least two object classes comprising at least two of a car, a bus, a bicycle, a motorcycle, and a pedestrian.

In an embodiment, the computer readable medium further includes instructions to cause the processor to detect the object in the image received from the vehicle sensor system and generate the at least the portion of the image based on a location of the detected object in the image.

In an embodiment, the computer readable medium further includes instructions to cause the processor to detect the object in the image received from the vehicle sensor system using one of a Fast Region-based Convolutional Network (Fast R-CNN) method and a You Look Only Once (YOLO) method and generate the at least the portion of the image based on a location of the detected object in the image.

In an embodiment, the computer readable medium further includes instructions to cause the processor to pre-train a feature extraction neural network to connect the plurality of concepts with image data associated with each of the at least two object classes, the feature extraction neural network comprising a neural network image encoder configured to generate the image embeddings associated with the at least the portion of the image including the object and a neural network text encoder configured to generate the concept embeddings associated with each of the plurality of concepts.

In an embodiment, the computer readable medium further includes instructions to cause the processor to generate the confidence score for each of the plurality of concepts by applying a cosine similarity function to the image embeddings and the concept embeddings associated with the concept.

In an embodiment, a method of classifying an object in an image at an automated driving system (ADS) of an autonomous vehicle includes generating image embeddings associated with at least a portion of an image generated by a vehicle sensor system at a neural network image encoder, the at least the portion of the image including an object; generating concept embeddings associated with each of a plurality of concepts at a neural network text encoder, each of the plurality of concepts being associated with one of at least two object classes; generating a confidence score for each of the plurality of concepts based on the image embeddings and the concept embeddings associated with the concept at a confidence score module; generating a predicted object class of the object based on an association between a set of concepts of the plurality of concepts having at least two of the highest values of the generated confidence scores and the one of the at least two object classes associated with a majority of the set of concepts at an object class prediction module; and managing performance of the autonomous vehicle based in part on the predicted object class of the object at a controller.

In an embodiment, the method further includes generating the concept embeddings associated with each of the plurality of concepts, each of the plurality of concepts associated with the one of the at least two object classes comprising a pre-defined concept.

In an embodiment, the method further includes generating the concept embeddings associated with each of the plurality of concepts, each of the plurality of concepts being associated with the one of the at least two object classes comprising at least two of a car, a bus, a bicycle, a motorcycle, and a pedestrian.

In an embodiment, the method further includes detecting the object in the image received from the vehicle sensor system; and generating the at least the portion of the image based on a location of the detected object in the image.

In an embodiment, the method further includes pre-training a feature extraction neural network comprising the neural network image encoder and the neural network text encoder to connect the plurality of concepts with image data associated with each of the at least two object classes at a feature extraction neural network training system.

In an embodiment, the method further includes generating the confidence score for each of the plurality of concepts by applying a cosine similarity function to the image embeddings and the concept embeddings associated with the concept.

BRIEF DESCRIPTION OF THE DRAWINGS

Exemplary embodiments will hereinafter be described in conjunction with the following drawing figures, wherein like numerals denote like elements.

FIG. 6A and FIG. 6B is a table including examples of confidence scores associated with example concepts of a car, a bus, a bicycle, a motorcycle, and a person generated by a confidence score module of an embodiment of an object detection system.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
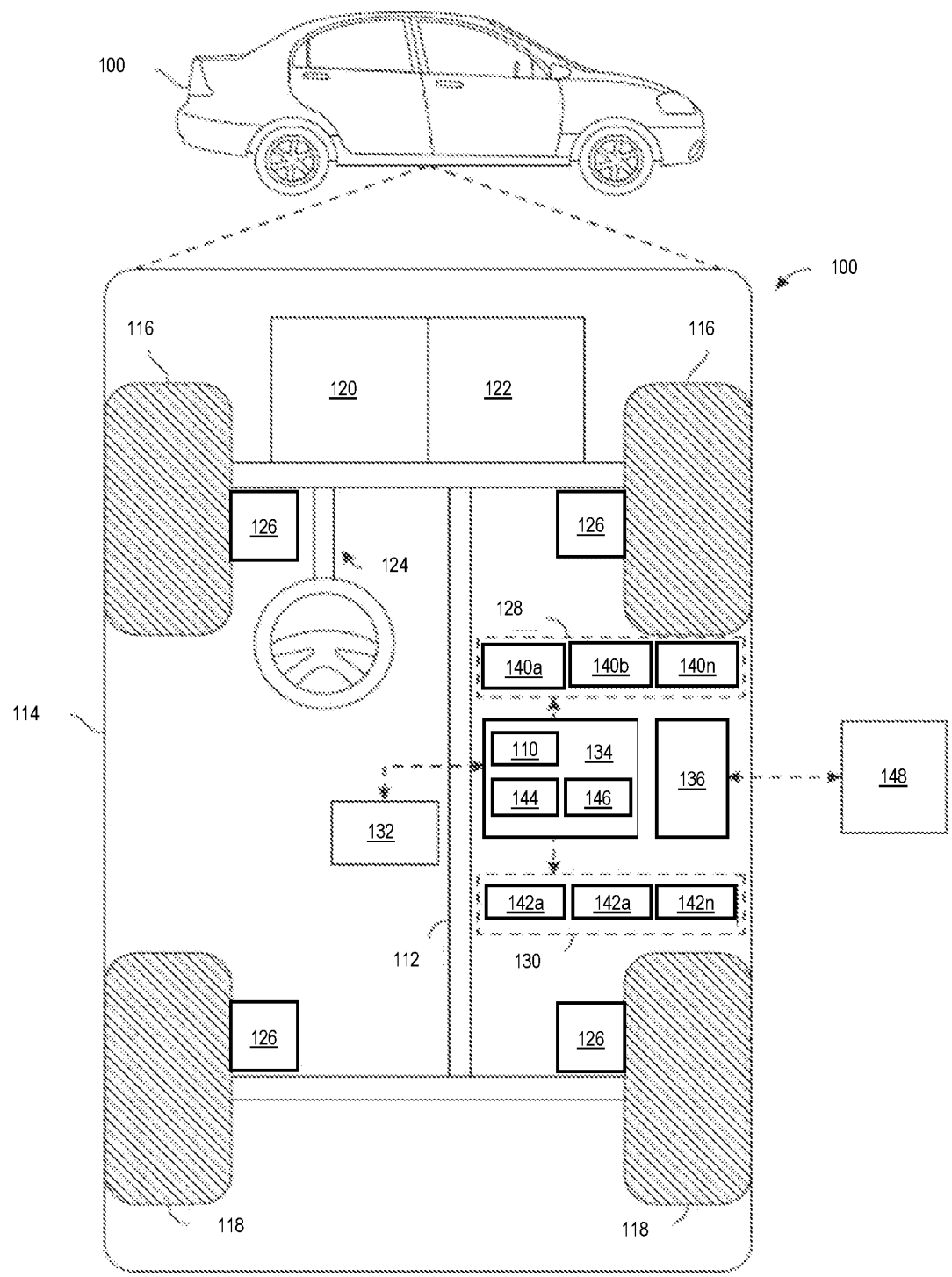
FIG. 1 is a functional block diagram representation of an autonomous vehicle including an embodiment of an object detection system.

Referring to FIG. 1, a functional block diagram representation of an autonomous vehicle 100 including an embodiment of an object detection system 110 is shown. The object detection system 110 configured to receive an image from the vehicle sensor system 128, detect one or more candidate objects in the image, and predict an object class of each of the detected objects. The object detection system 110 is pre-trained to predict pre-defined object classes using pre-defined concepts associated with each of the pre-defined object classes. Examples of object classes include, but are not limited to, a car, a bus, a bicycle, a motorcycle, and a person.

The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft. In an embodiment, the autonomous vehicle 100 is a so-called Level Four or Level Five automation system. A Level Four system indicates "high automation", referring to the driving mode-specific performance by an automated driving system (ADS) of all aspects of the dynamic driving task, even if a human driver does not respond appropriately to a request to intervene. A Level Five system indicates "full automation", referring to the full-time performance by an ADS of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities ("vehicle-to-everything (V2X)" communication). For example, the vehicle communication system 136 is configured to wireless communicate information to and from other vehicles 148 ("vehicle-to-vehicle (V2V)" communication), to and from driving system infrastructure ("vehicle to infrastructure (V2I)" communication), remote systems, and/or personal devices. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes an embodiment of the object detection system 110. The processor 144 can be any custom made or commercially available processor, a central processing unit (CPU), a graphics processing unit (GPU), an auxiliary processor among several processors associated with the controller 134, a semiconductor-based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions described with reference to one or a combination of embodiments of the object detection system 110.

Figure 2:
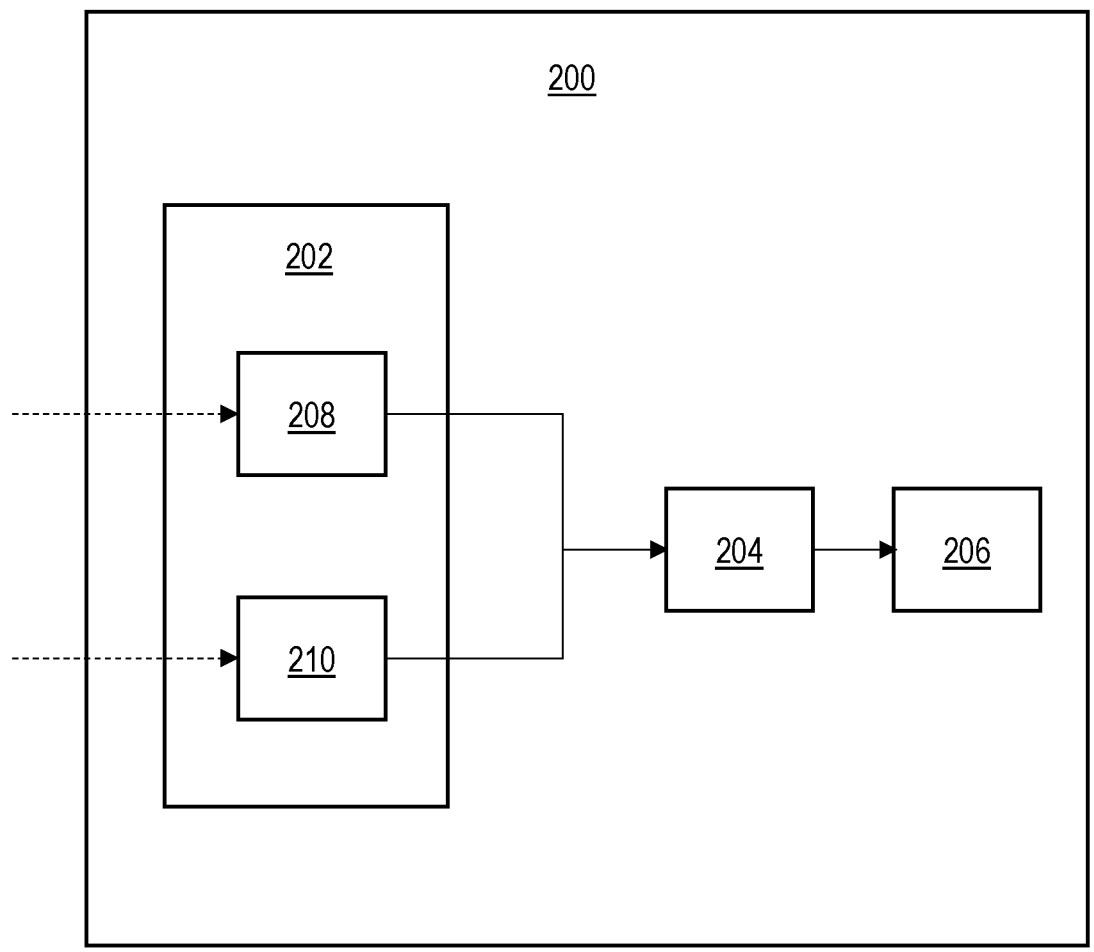
FIG. 2 is a functional block diagram representation of an embodiment of a feature extraction neural network training system configured train an embodiment of a feature extraction neural network.

Referring to FIG. 2, a functional block diagram representation of an embodiment of a feature extraction neural network training system 200 configured train an embodiment of a feature extraction neural network 202 is shown. In an embodiment, the feature extraction neural network training system 200 is configured to pair pre-defined concepts associated with different object classes with image data associated with the object class related to the concept using Contrastive Language-Image Pre-Training (CLIP). The concepts are in the form of text. The feature extraction neural network training system 200 includes the feature extraction neural network 202 to be trained, a similarity score module 204 and a contrastive loss module 206. The feature extraction neural network 202 includes a neural network text encoder 208 and a neural network image encoder 210.

The neural network text encoder 208 is configured to receive each of the pre-defined concepts associated with the pre-defined object classes and generate concept embeddings associated with the received concept. The concept embeddings may be referred to as low level concept features. The concept embeddings are dimensional vectors. Examples of object classes include, but are not limited to a car, a bus, a bicycle, a motorcycle, and a person.

Examples of pre-defined concepts associated with a car include, but are not limited to, a windshield of a car, a fog light of a car, a license plate lamp of a car, a windscreen of a car, wind shield wipers of a car, headlights of a car, and taillights of a car. Examples of pre-defined concepts associated with a bus include, but are not limited to, a tire of a bus, a gate of a bus, wheels of a bus, a bumper of a bus, a street light of a bus, a front light of a bus, a rear light of a bus, a left indicator of a bus, a right indicator of a bus, windows of a bus, a headlamp of a bus, a windshield of a bus, top windows of a bus, front license plate of a bus, a headlight of a bus, and a reflector of a bus.

Examples of pre-defined concepts associated with a bicycle include, but are not limited to, a seat of a bicycle, a basket of a bicycle, a lock of a bicycle, a handlebar of a bicycle, a bell of a bicycle, a pedal of a bicycle, a tire of a bicycle, spokes of a bicycle, a tire of a bicycle, and a reflector of a bicycle. Examples of pre-defined concepts associated with a motorcycle include, but are not limited to, a helmet of a motorcycle, a ground of a motorcycle, a trim of a motorcycle, an engine of a motorcycle, a mirror of a motorcycle, a handlebar of a motorcycle, spokes of a motorcycle, and bolts of a motorcycle. Examples of pre-defined concepts associated with the person include, but are not limited to, a head of a person, an arm of a person, a hand of a person, a leg of a person, feet of a person, an ear of a person, a nose of a person, a body of a person, and a neck of a person.

The neural network image encoder 210 is configured to receive images generated by a search of images based on the object class associated with the pre-defined concepts provided to the neural network text encoder 208 and generate image embeddings associated with the images. The images may be referred to as image data. The image embeddings may be referred to as low level image features. The image embeddings may are dimensional vectors.

The similarity score module 204 is configured to receive the concept embeddings generated by the neural network text encoder 208 in response to receiving a concept as an input and the image embeddings generated by the neural network image encoder 210 in response to an image resulting from the search. The similarity score module 204 is configured to generate a similarity score based on the receive concept embeddings and the image embeddings. The similarity score module 204 is configured to apply a cosine similarity function to the concept embeddings and the image embeddings to generate the similarity score. The contrastive loss module 206 is configured to use the similarity scores generated based on the concept embeddings associated with a concept and the image embeddings associated with each of the images resulting from the search to jointly train the neural network text encoder 208 and the neural network image encoder 210 using pairs of the concepts and the images. The feature extraction neural network training system 200 may include additional components that facilitate the training of the feature extraction neural network 202

Figure 3:
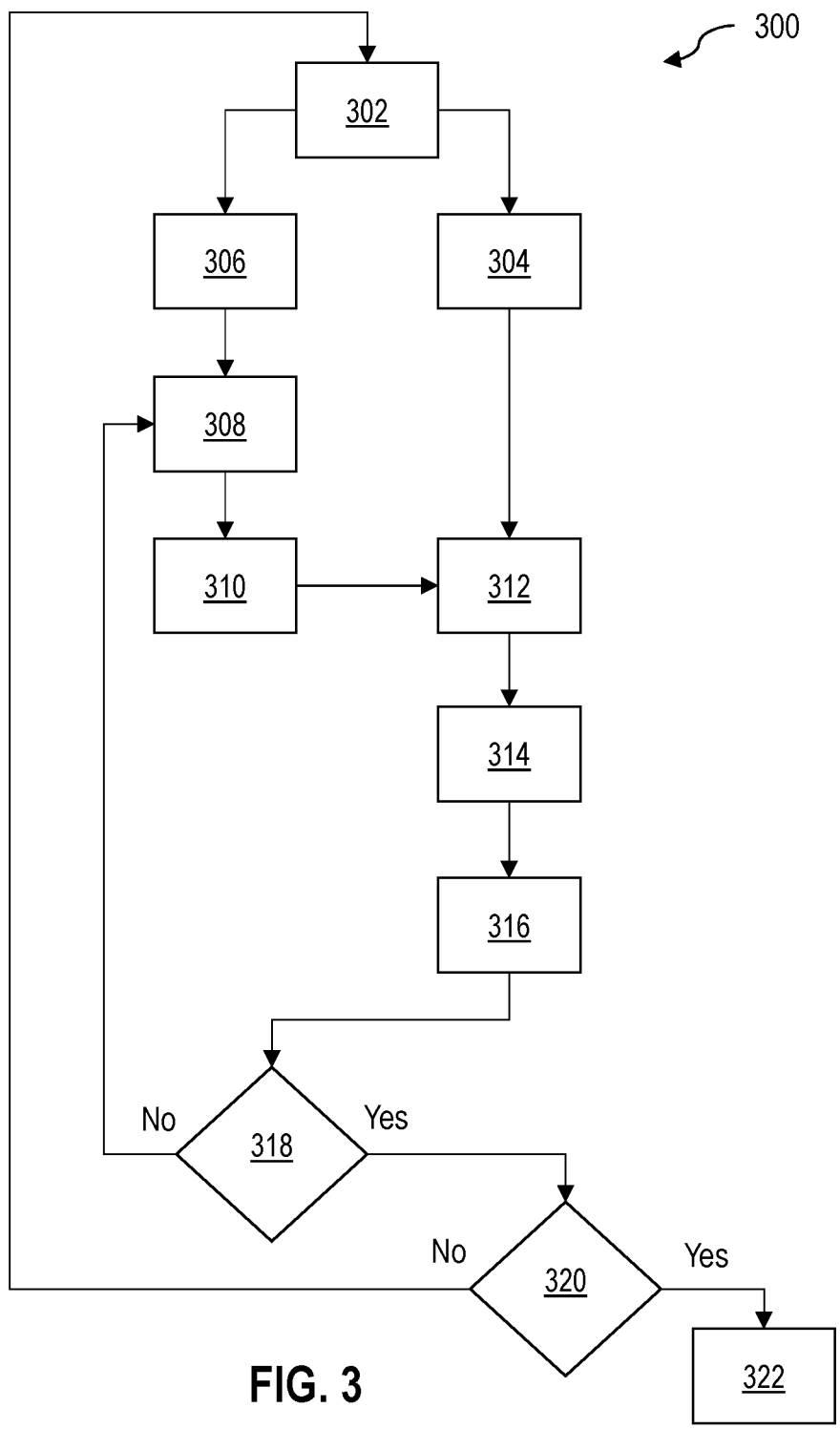
FIG. 3 is a flow chart representation of an example of a method of training an embodiment of a feature extraction neural network.

Referring to FIG. 3 a flow chart representation of an example of a method 300 of training an embodiment of a feature extraction neural network 202 is shown. The method 300 is performed by a feature extraction neural network training system 200. The method 300 may be performed by hardware circuitry, firmware, software, and/or combinations thereof.

At 302, a concept associated with an object class is provided to the neural network text encoder 208. The neural network text encoder 208 generates concept embeddings associated with the received concept at 304. A set of images is generated based on a performance of a search of images associated with the object class at 306 and an image from the set of images is provided to the neural network image encoder 210 at 308. The neural network image encoder 210 generates image embeddings associated with the image at 310. At 312, the similarity score module 204 receives the concept embeddings and the image embeddings and at 314 the similarity score module 204 generates a similarity score based on the concept embeddings and the image embeddings. In an embodiment, the similarity score module 204 uses a cosine similarity function to generate the similarity score. The contrastive loss module trains the feature extraction neural network 202 in accordance with a weighting of the image based on the similarity score at 316.

At 318, the feature extraction neural network training system 200 determines whether all of the images in the set of images generated based on the object class associated with the concept have been used to train the feature extraction neural network 202. If the feature extraction neural network training system 200 determines that all of the images in the set of images generated based on the object class associated with the concept have not been used to train the feature extraction neural network 202, the method 300 proceeds to 308 and the next image in the set of images is provided to the neural network image encoder 210.

If the feature extraction neural network training system 200 determines that all of the images in the set of images generated based on the object class associated with the concept have been used to train the feature extraction neural network 202, the feature extraction neural network training system 200 determines whether all of the pre-defined concepts associated with the object class have been provided to the neural network text encoder 208 at 320.

If the feature extraction neural network training system 200 determines that all of the pre-defined concepts associated with the object class have not been provided to the neural network text encoder 208 at 320, the method 300 proceeds to 302 and the next concept associated with the object class is provided to the neural network text encoder 208. If the feature extraction neural network training system 200 determines that all of the pre-defined concepts associated with the object class have been provided to the neural network text encoder 208, the feature extraction neural network training system 200 determines that the training of the feature extraction neural network 202 with respect to the object class is complete at 322. The method 300 is repeated for each of the pre-defined object classes.

Figure 4:
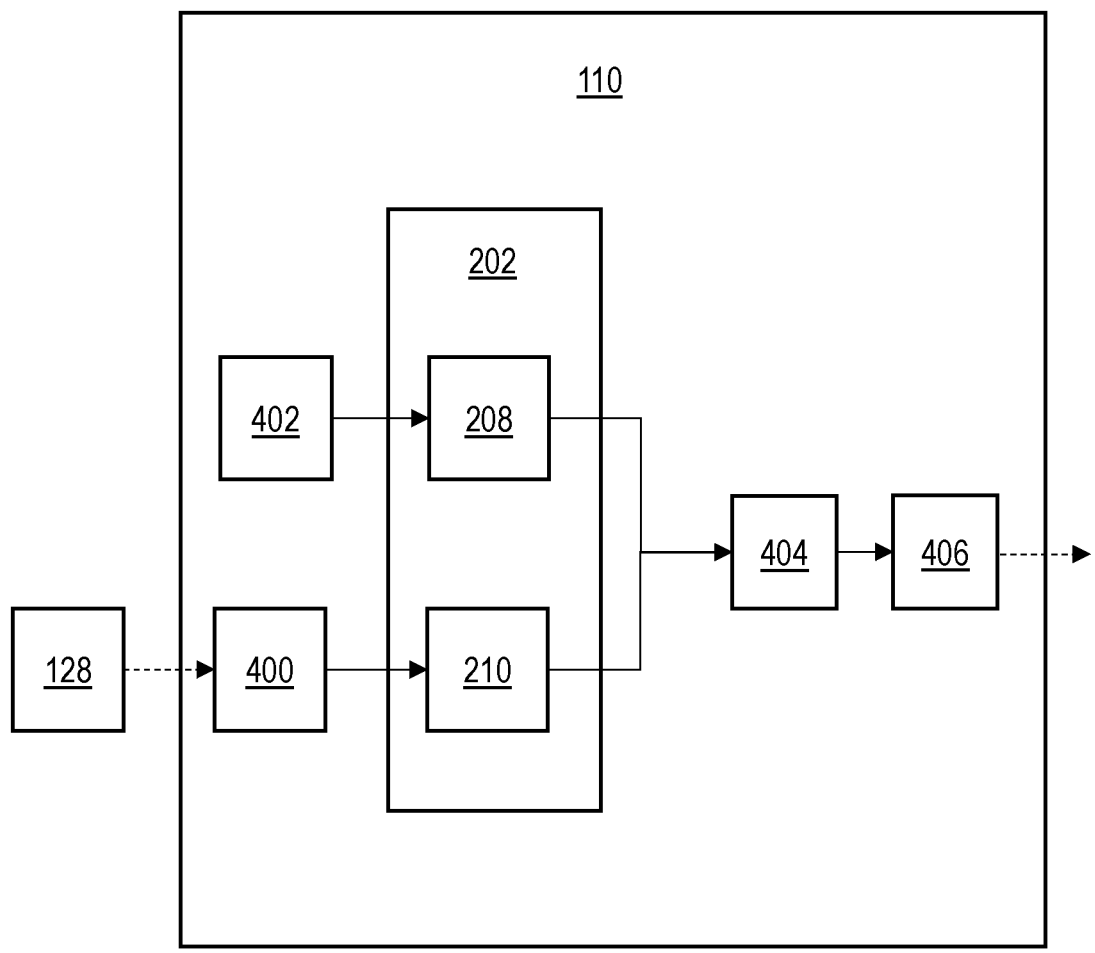
FIG. 4 is a functional block diagram of an embodiment of an object detection system including a feature extraction neural network.

Referring to FIG. 4, a functional block diagram of an embodiment of an object detection system 110 including a feature extraction neural network 202 is shown. The object detection system 110 is communicatively coupled to a vehicle sensor system 128 of an autonomous vehicle 100. The object detection system 110 configured to receive an image from the vehicle sensor system 128, detect one or more objects in the image, and predict an object class of each of the detected objects. The object detection system 110 is pre-trained to predict pre-defined object classes using pre-defined concepts associated with each of the pre-defined object classes. Examples of object classes include, but are not limited to, a car, a bus, a bicycle, a motorcycle, and a person.

The vehicle sensor system 128 includes one or more vehicle sensing devices 140a-140n that sense observable conditions of the exterior environment and/or the interior environment of the autonomous vehicle 100 and generate sensed data. Examples of vehicle sensing devices 140a-140n include, but are not limited to, radars, lidars, global positioning systems, optical cameras, thermal cameras, ultrasonic sensors, and/or other sensors. The vehicle sensor system 128 is configured to generate an image based on data sensed by the one or more vehicle sensing devices 140a-140n.

The object detection system 110 includes the feature extraction neural network 202, an object candidate module 400, a concept module 402, a confidence score module 404, and an object class prediction module 406. The feature extraction neural network 202 includes a neural network text encoder 208 and a neural network image encoder 210. The object detection system 110 may include additional components that facilitate operation of the object classification system.

The object candidate module 400 is configured to receive an image generated by the vehicle sensor system 128. In an embodiment, the object candidate module 400 is configured to propose one or more candidate object regions in the image using a Fast Region-based Convolutional Network (Fast R-CNN) method. In an embodiment, the object candidate module 400 is configured to propose one or more candidate object regions in the image using a You Look Only Once (YOLO) method. In alternative embodiments, other types of object detection methods may be used to propose one or more candidate object regions in the image. In an embodiment, the object candidate module 400 is configured to generate a candidate object image region for each possible object in the image. Each of the candidate object regions or is processed individually by the object detection system 110 to classify the detected object in the candidate object region. The candidate object region may also be referred to as an image patch. Each image patch is at least a portion of the image and includes an object. The object may also be referred to as a candidate object.

The neural network image encoder 210 is configured to receive an image patch including a candidate object and generate image embeddings associated with the image patch. The image embeddings may also be referred to as low level features of the image patch. The image embeddings are dimension vectors.

Each object class is associated with a set of pre-defined concepts. As described above, the feature extraction neural network 202 of the object detection system 110 is pre-trained using the pre-defined concepts of each of the object classes. The pre-defined concepts have a text format. The concept module 402 is configured to individually provide each of the pre-defined concepts to the neural network text encoder 208. In an embodiment the concept module 402 is configured to individually provide each of the pre-defined concepts associated with an object class, one object class at a time. Upon the receipt of a pre-defined concept of an object class, the neural network text encoder 208 is configured to generate concept embeddings associated with that pre-defined concept. The concept embeddings may also be referred to as low level features of the pre-defined concept or as low level concept features. The concept embeddings are dimension vectors.

Examples of object classes include, but are not limited to, a car, a bus, a bicycle, a motorcycle, and a person. Examples of pre-defined concepts associated with a car include, but are not limited to, a windshield of a car, a fog light of a car, a license plate lamp of a car, a windscreen of a car, wind shield wipers of a car, headlights of a car, and taillights of a car. Examples of pre-defined concepts associated with a bus include, but are not limited to, a tire of a bus, a gate of a bus, wheels of a bus, a bumper of a bus, a street light of a bus, a front light of a bus, a rear light of a bus, a left indicator of a bus, a right indicator of a bus, windows of a bus, a headlamp of a bus, a windshield of a bus, top windows of a bus, front license plate of a bus, a headlight of a bus, and a reflector of a bus.

Examples of pre-defined concepts associated with a bicycle include, but are not limited to, a seat of a bicycle, a basket of a bicycle, a lock of a bicycle, a handlebar of a bicycle, a bell of a bicycle, a pedal of a bicycle, a tire of a bicycle, spokes of a bicycle, a tire of a bicycle, and a reflector of a bicycle. Examples of pre-defined concepts associated with a motorcycle include, but are not limited to, a helmet of a motorcycle, a ground of a motorcycle, a trim of a motorcycle, an engine of a motorcycle, a mirror of a motorcycle, a handlebar of a motorcycle, spokes of a motorcycle, and bolts of a motorcycle. Examples of pre-defined concepts associated with the person include, but are not limited to, a head of a person, an arm of a person, a hand of a person, a leg of a person, feet of a person, an ear of a person, a nose of a person, a body of a person, and a neck of a person.

The image embeddings associated with the image patch generated by the neural network image encoder 210 and the concept embeddings associated with a concept of an object class generated by the neural network text encoder 208 are received at the confidence score module 404. The confidence score module 404 is configured to generate a confidence score based on the concept embeddings and the image embeddings. The higher the confidence score associated with a concept, the higher the confidence that the concept is present in the image patch. The lower the confidence score associated with a concept, the lower the confidence that the concept is present in the image patch. The confidence score associated with the concept text is provided to the object class prediction module 406.

As the concept associated with each object class is provided individually to the neural network text encoder 208. The concept embeddings associated with each concept is provided to the confidence score module 404 and the confidence score module 404 provides a confidence score associated with the received concept to the object class prediction module 406. The object class prediction module 406 is configured to receive the confidences scores associated with each of the concepts. Each of the concepts is associated with an object class.

In an embodiment, the object class prediction module 406 is configured to identify a pre-defined number of the highest confidence scores generated by the confidence score module 404 in connection with the associated with an image patch. For example, the object class prediction module 406 may be configured to identify the five highest confidence scores generated by the confidence score module 404. In another example, the object class prediction module 406 is configured to identify the three highest confidence scores of concept texts generated by the confidence score module 404.

The object class prediction module 406 is configured to identify the concept associated with each of the identified highest confidence scores. The object class prediction module 406 is configured to identify the object class associated with each of the identified concepts. The object class prediction module 406 is configured to determine the number of the identified concept associated with each of the object classes and to select the object class associated with the highest number of identified concept as the predicted object class in the image patch. The image detection system 110 repeats this process with each of the image patches associated with the image received from the vehicle sensor system 128.

The ADS is configured to receive the one or more predicted object classes present in an image generated by the vehicle sensor system 128 and manage performance of the autonomous vehicle 100 in accordance with the presence of the one predicted object classes with a vicinity of the autonomous vehicle 100.

Figure 5:
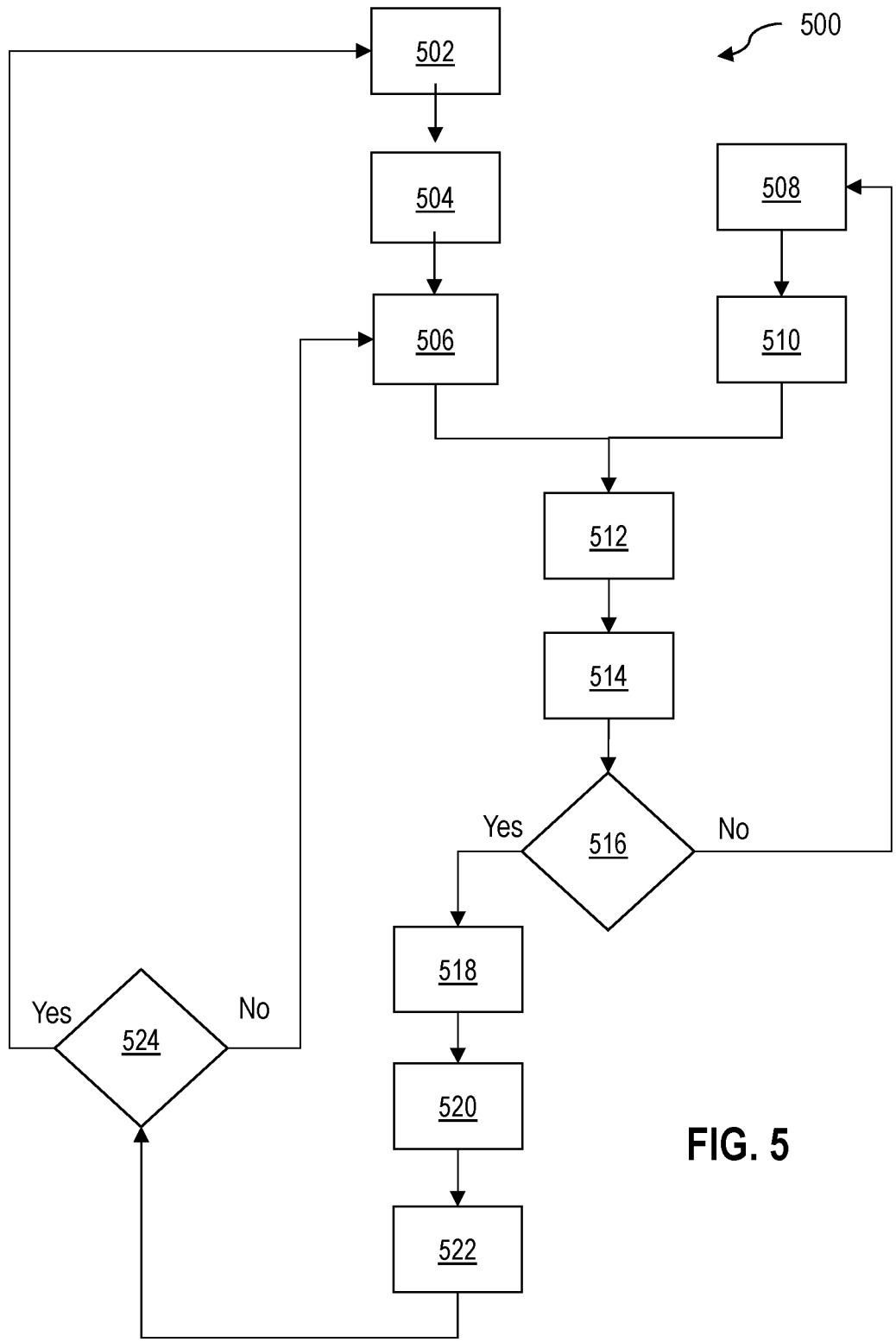
FIG. 5 is a flow chart representation of an example of a method of classifying a detected object in an image using an embodiment of an object detection system at an automated driving system.

Referring to FIG. 5, a flow chart representation of an example of a method 500 of classifying an object in an image using an embodiment of an object detection system 110 at an automated driving system (ADS) is shown. The method 500 is performed by a controller 134 including an embodiment of the object detection system 110. The method 500 may be performed by the controller 134 in combination with other components of the autonomous vehicle 100. The method 500 may be performed by hardware circuitry, firmware, software, and/or combinations thereof.

At 502, the object candidate module 400 receives an image generated by the vehicle sensor system 128. At 504, the object candidate module 400 detects one or more objects in the image and generates an image patch for each detected object. At 506, the neural network image encoder 210 receives an image patch and generates image embeddings associated with the image patch.

At 508, the concept module 402 provides one of a plurality of pre-defined concepts to the neural network text encoder 208. At 510, the neural network text encoder 208 generates concept embeddings associated with the concept. Each of the concepts is pre-defined and associated with an object class. The neural network text encoder 208 is configured to generate concept embedding associated with a concept based on a pre-training of the feature extraction neural network 202 based on pairings of the concept with image data associated with the object class associated with the concept.

At 512, the confidence score module 404 generates a confidence score based on the image embeddings associated with the image patch generated by the neural network image encoder 210 and the concept embeddings associated with a concept generated by the neural network text encoder 208. In an embodiment, the confidence score module 404 applies a cosine similarity function to the image embeddings and the concept embeddings to generate the confidence score. At 514, the confidence score module 404 transmits the confidence score associated with the concept to the object class prediction module 406.

At 516, the object detection system 110 determines whether the plurality of pre-defined concepts have been processed with respect to the image patch to generate a confidence score for each of the concepts. If the object detection system 110 determines that the plurality of pre-defined concepts have not been processed with respect to the image patch to generate a confidence score for each of the concepts, the method 500 proceeds to 508 where the concept module 402 provides another one of the plurality of pre-defined concepts to the neural network text encoder 208.

If the object detection system 110 determines that the plurality of pre-defined concepts have been processed with respect to the image patch to generate a confidence score for each of the concepts, the object class prediction module 406 identifies a pre-defined number of the highest confidence scores received from the confidence score module 404 in connection with the image patch at 518. The object class prediction module 406 identifies the concepts associated with each of the identified confidence scores at 520. The object class prediction module 406 identifies the object class associated with a majority of the identified concepts and generates the identified object class as the predicted object class of the object in the image patch at 522. The ADS manages the performance of the autonomous vehicle 100 in accordance with a presence of the predicted object class in the image generated by the vehicle sensor system 128.

The object detection system 110 determines whether all of the image patches associated with the image generated by the vehicle sensor system 128 have been processed at 524. If the object detection system 110 determines that all of the image patches associated with the image generated by the vehicle sensor system 128 have not been processed, the method 500 proceeds to 506, where the neural network image encoder 210 receives another image patch associated with the image and generates image embeddings associated with the image patch for processing by the object detection system 110.

If the object detection system 110 determines that all of the image patches associated with the image generated by the vehicle sensor system 128 have been processed, the method 500 returns to 502 where a new image is received from the vehicle sensor system 128 for processing by the object detection system 110.

Referring to FIG. 6A and FIG. 6B, tables including examples of confidence scores associated with example concepts of different object classes including a car, a bus, a bicycle, a motorcycle, and a person generated by a confidence score module 404 of an embodiment of an object detection system 110 is shown. The object class prediction module 406 selected the five highest confidence scores generated by the confidence score module 404 in connection with an image patch in the example. The five highest confidence scores generated by the confidence score module 404 in the example are 0.30, 0.29, 028. 0.27, and 0.26.

The object class prediction module 406 identified the concepts associated with each of the identified confidence scores. The identified concepts and associated confidence scores are in bold in the table shown in FIG. 6A. The concept associated with the confidence score of 0.30 is a front license plate of a bus. The concepts associated with the confidence score of 0.29 are a gate of a bus, a bumper of a bus, and a right indicator of a bus. The concepts associated with the confidence score of 0.28 are a street light of a bus, a left indicator of a bus, and a reflector of a bus. The concepts associated with the confidence score of 0.27 are a tire of a bus, a front light of bus, windows of a bus, and a headlight of a bus. The concepts associated with the confidence score of 0.26 are a rear light of a bus, wheels of a bus, a headlamp of a bus, and a windshield of a bus. In the example, the object class prediction module 406 identified the object class associated with a majority of the identified concepts as a bus and generated a bus as the predicted object class of the object in the image patch.

Figure 7:
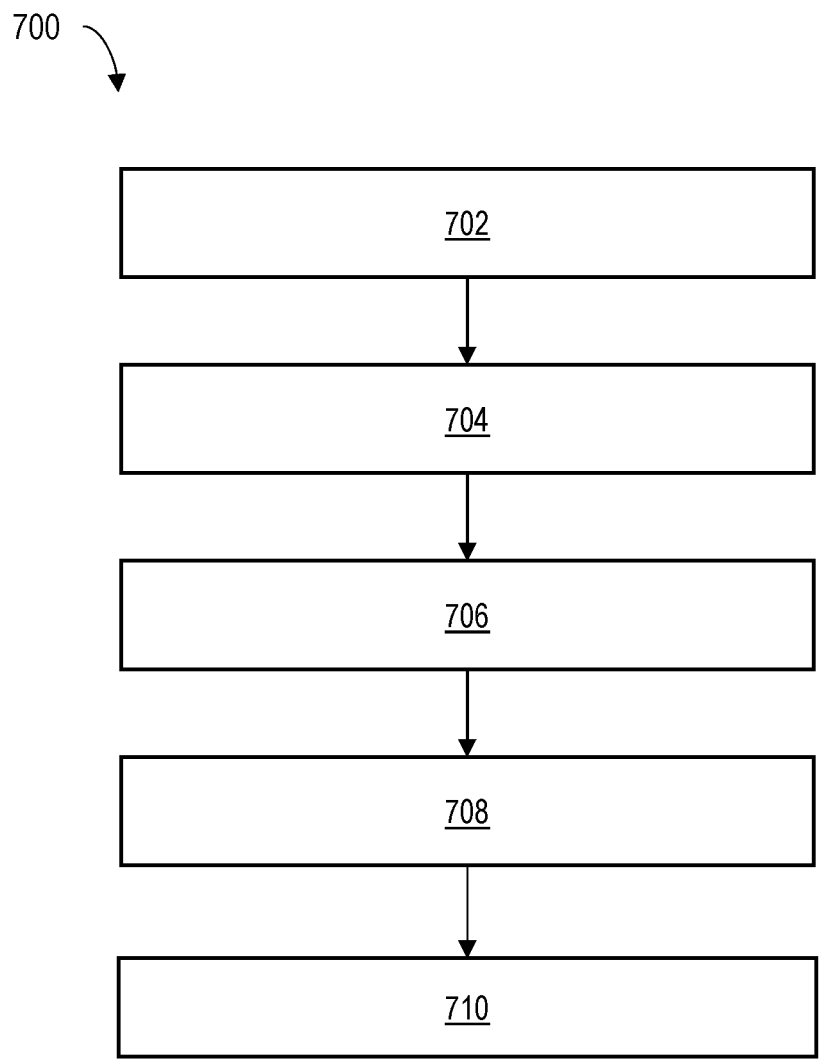
FIG. 7 is a flow chart representation of an example of a method of classifying a detected object in an image using an embodiment of an object detection system at an automated driving system.

Referring to FIG. 7, a flow chart representation of an example of a flow chart representation of an example of a method 700 of classifying an object in an image using an embodiment of an object detection system 110 at an automated driving system (ADS) is shown. The method 700 is performed by a controller 134 including an embodiment of the embodiment of the object detection system 110. The method 700 may be performed by the controller 134 in combination with other components of the autonomous vehicle 100. The method 700 may be performed by hardware circuitry, firmware, software, and/or combinations thereof.

At 702, image embeddings associated with at least a portion of an image generated by a vehicle sensor system 128 are generated at a neural network image encoder 210. The at least the portion of the image includes an object. At 704, concept embeddings associated with each of a plurality of concepts are generated at a neural network text encoder 208. Each of the plurality of concepts is associated with one of at least two object classes. At 706, a confidence score for each of the plurality of concepts is generated at a confidence score module 404. The confidence score for each of the plurality of concepts is generated based on the image embeddings and the concept embeddings associated with the concept. At 708, a predicted object class of the object is generated based on an association between a set of concepts of the plurality of concepts having at least two of the highest values of the generated confidence scores and the one of the at least two object classes associated with a majority of the set of concepts at an object class prediction module 406. At, 710, performance of the autonomous vehicle based in part on the predicted object class of the object is managed at a controller 134.

Classifying objects in images captured by a vehicle sensor system 128 of an autonomous vehicle 100 in low visibility environments may pose a challenge due to a lack of clarity of representative features associated with the objects that are typically relatively easily identifiable in images captured under normal weather conditions. The use of an object detection system 110 including a feature extraction neural network 202 to identify concepts associated with an object class and using the identified concepts to classify an object detected in an image may enable the classification of objects in images captured under low visibility conditions. The use of concepts to classify an object may provide a higher level of abstraction of a detected object when compared to the use of representative features of a detected object to classify the object.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof

What is claimed is:

1. An automated driving system (ADS) of an autonomous vehicle including an object detection system, comprising:
   a neural network image encoder configured to generate image embeddings associated with at least a portion of an image generated by a vehicle sensor system, the at least the portion of the image including an object;
   a neural network text encoder configured to generate concept embeddings associated with each of a plurality of concepts, each of the plurality of concepts being associated with one of at least two object classes;
   a confidence score module configured to generate a confidence score for each of the plurality of concepts based on the image embeddings and the concept embeddings associated with the concept;
   an object class prediction module configured to generate a predicted object class of the object based on an association between a set of concepts of the plurality of concepts having at least two of the highest values of the generated confidence scores and the one of the at least two object classes associated with a majority of the set of concepts; and
   a processor configured to manage performance of the autonomous vehicle based in part on the predicted object class of the object.

2. The system of claim 1, wherein each of the plurality of concepts is associated with the one of the at least two object classes comprise a pre-defined concept.

3. The system of claim 1, wherein the object classes of the at least two object classes comprise at least two of a car, a bus, a bicycle, a motorcycle, and a pedestrian.

4. The system of claim 1, further comprising an object candidate module configured to detect the object in the image received from the vehicle sensor system and generate the at least the portion of the image based on a location of the detected object in the image.

5. The system of claim 4, wherein the object candidate module is configured to implement one of a Fast Region-based Convolutional Network (Fast R-CNN) method and a You Look Only Once (YOLO) method.

6. The system of claim 1, further comprising a feature extraction neural network including the neural network image encoder and the neural network text encoder, wherein the feature extraction neural network is configured to be pre-trained to connect the plurality of concepts with image data associated with each of the at least two object classes by a feature extraction neural network training system.

7. The system of claim 1, wherein the confidence score module is configured to generate the confidence score for each of the plurality of concepts by applying a cosine similarity function to the image embeddings and the concept embeddings associated with the concept.

8. A non-transitory computer readable medium comprising instructions stored thereon for classifying a detected object in an image at an automated driving system (ADS), that upon execution by a processor, cause the processor to: generate image embeddings associated with at least a portion of an image generated by a vehicle sensor system, the at least the portion of the image including an object; generate concept embeddings associated with each of a plurality of concepts, each of the plurality of concepts being associated with one of at least two object classes; generate a confidence score for each of the plurality of concepts based on the image embeddings and the concept embeddings associated with the concept; generate a predicted object class of the object based on an association between a set of concepts of the plurality of concepts having at least two of the highest values of the generated confidence scores and the one of the at least two object classes associated with a majority of the set of concepts; and manage performance of the autonomous vehicle based in part on the predicted object class of the object.

9. The non-transitory computer readable medium of claim 8, further comprising instructions to cause the processor to generate the concept embeddings associated with each of the plurality of concepts, each of the plurality of concepts associated with the one of the at least two object classes comprising a pre-defined concept.

10. The non-transitory computer readable medium of claim 8, further comprising instructions to cause the processor to generate the concept embeddings associated with each of the plurality of concepts, each of the plurality of concepts being associated with the one of the at least two object classes comprising at least two of a car, a bus, a bicycle, a motorcycle, and a pedestrian.

11. The non-transitory computer readable medium of claim 8, further comprising instructions to cause the processor to detect the object in the image received from the vehicle sensor system and generate the at least the portion of the image based on a location of the detected object in the image.

12. The non-transitory computer readable medium of claim 8, further comprising instructions to cause the processor to detect the object in the image received from the vehicle sensor system using one of a Fast Region-based Convolutional Network (Fast R-CNN) method and a You Look Only Once (YOLO) method and generate the at least the portion of the image based on a location of the detected object in the image.

13. The non-transitory computer readable medium of claim 12, further comprising instructions to cause the processor to pre-train a feature extraction neural network to connect the plurality of concepts with image data associated with each of the at least two object classes, the feature extraction neural network comprising a neural network image encoder configured to generate the image embeddings associated with the at least the portion of the image including the object and a neural network text encoder configured to generate the concept embeddings associated with each of the plurality of concepts.

14. The non-transitory computer readable medium of claim 8, further comprising instructions to cause the processor to generate the confidence score for each of the plurality of concepts by applying a cosine similarity function to the image embeddings and the concept embeddings associated with the concept.

15. A method of classifying a detected object in an image at an automated driving system (ADS) of an autonomous vehicle comprising:
   generating image embeddings associated with at least a portion of an image generated by a vehicle sensor system at a neural network image encoder, the at least the portion of the image including an object;
   generating concept embeddings associated with each of a plurality of concepts at a neural network text encoder, each of the plurality of concepts being associated with one of at least two object classes;
   generating a confidence score for each of the plurality of concepts based on the image embeddings and the concept embeddings associated with the concept at a confidence score module;
   generating a predicted object class of the object based on an association between a set of concepts of the plurality of concepts having at least two of the highest values of the generated confidence scores and the one of the at least two object classes associated with a majority of the set of concepts at an object class prediction module; and
   managing performance of the autonomous vehicle based in part on the predicted object class of the object at a controller.

16. The method of claim 15, further comprising generating the concept embeddings associated with each of the plurality of concepts, each of the plurality of concepts associated with the one of the at least two object classes comprising a pre-defined concept.

17. The method of claim 15, further comprising generating the concept embeddings associated with each of the plurality of concepts, each of the plurality of concepts being associated with the one of the at least two object classes comprising at least two of a car, a bus, a bicycle, a motorcycle, and a pedestrian.

18. The method of claim 17, further comprising:
   detecting the object in the image received from the vehicle sensor system; and
   generating the at least the portion of the image based on a location of the detected object in the image.

19. The method of claim 15, further comprising pre-training a feature extraction neural network comprising the neural network image encoder and the neural network text encoder to connect the plurality of concepts with image data associated with each of the at least two object classes at a feature extraction neural network training system.

20. The method of claim 15, further comprising generating the confidence score for each of the plurality of concepts by applying a cosine similarity function to the image embeddings and the concept embeddings associated with the concept.

* * * * *